Aug. 4, 1925.

P. FISHER

SUSPENSION DEVICE

Filed Jan. 8, 1924

1,548,128

Inventor
Parris Fisher

Attorney

Patented Aug. 4, 1925.

1,548,128

UNITED STATES PATENT OFFICE.

PARRIS FISHER, OF EASTON, PENNSYLVANIA.

SUSPENSION DEVICE.

Application filed January 8, 1924. Serial No. 685,032.

*To all whom it may concern:*

Be it known that I, PARRIS FISHER, a citizen of the United States, residing at Wilson Borough, Easton, in the county of Northampton and State of Pennsylvania, have invented new and useful Improvements in Suspension Devices, of which the following is a specification.

This invention relates to supports, particularly to suspension devices, and has for its object the provision of a novel screw hook or loop designed particularly for supporting clothes lines and many other devices of a more or less similar nature, the hook or loop being additionally capable of employment as a handle usable for instance in a foundry for lifting patterns, etc., though it should be distinctly understood at this point that there is no limitation as to specific use inasmuch as its employment may be found of advantage in a wide variety of arts.

An important object is the provision of a device of this character which embodies a securing screw which is capable of being easily replaced in case of breakage thereof or stripping of its threads, the device embodying an element cooperating with the screw for effecting turning thereof and for holding the body of the device stationary with respect to the screw when desired.

An additional object is the provision of a supporting hook or loop which will be simple and inexpensive in manufacture, easy to apply, positive in action, efficient and durable in service, and a general improvement in the art.

With the above and other objects and advantages in view, the invention consists in the combination and arrangement of parts to to be hereinafter more fully described and claimed and illustrated in the accompanying drawings in which Figure 1 is a side elevation of the device showing it engaged with a support.

Figure 1:
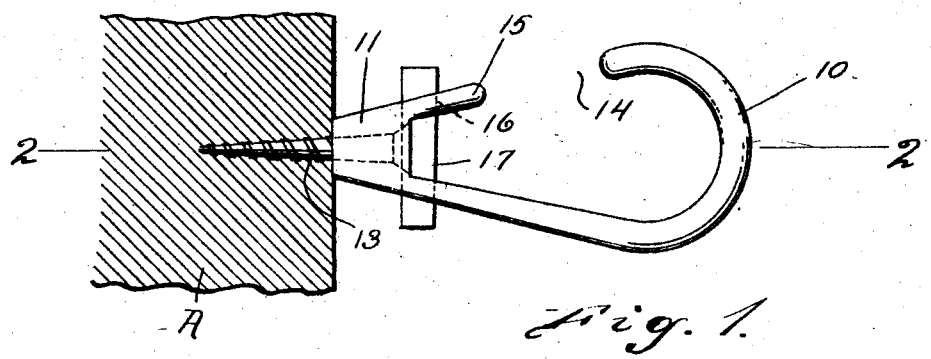

Referring more particularly to the drawings, I have shown the device as comprising a hook-shaped body 10 formed at one end with a thickened shank 11 having a countersunk hole 12 therethrough for the passage of a securing screw 13 which has its head located within the counter-sink so as to be flush with the edge of the shank. Obviously, this screw might be of the machine type in case the hook is to be associated with a metallic element, though in the present instance the screw is represented as being of the tapered or wood type. The opening 14 which forms the entrance to the hook does not extend clear to the shank so as to leave a projecting portion 15 which extends considerably outwardly beyond the shank.

The projection 15 and opposite side of the hook are formed with slots 16 for the passage of a wedge 17 which is engageable within the slot 18 of the screw head.

In applying the device for the suspension of a clothes line or the like, the screw 13 is inserted through the hole 12 and the wedge member 17 inserted through the slot 16 so as to extend within the groove or slot of the screw head and consequently hold the screw stationary with respect to the body or hook. The device is then turned while pressure is applied thereto for driving the screw into the support indicated at A which might be of any desired character. In case the screw becomes broken off it is evident that the wedge 17 may be removed and the broken screw replaced by a new one, after which the wedge is reinserted in place to exert its holding action.

Figure 2:
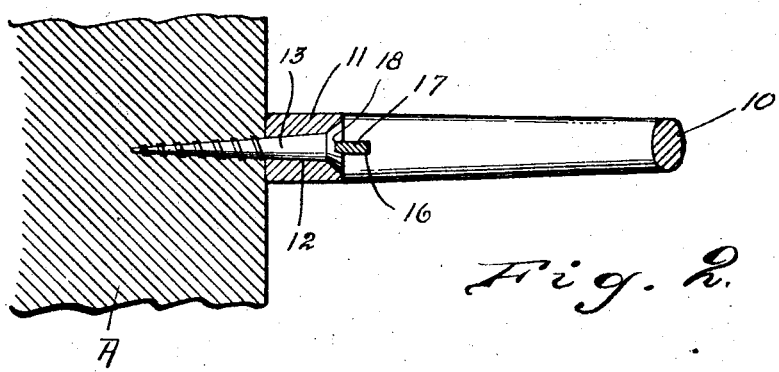
Figure 2 is a section on the line 2—2 of Figure 1.
Figures 3, 4:
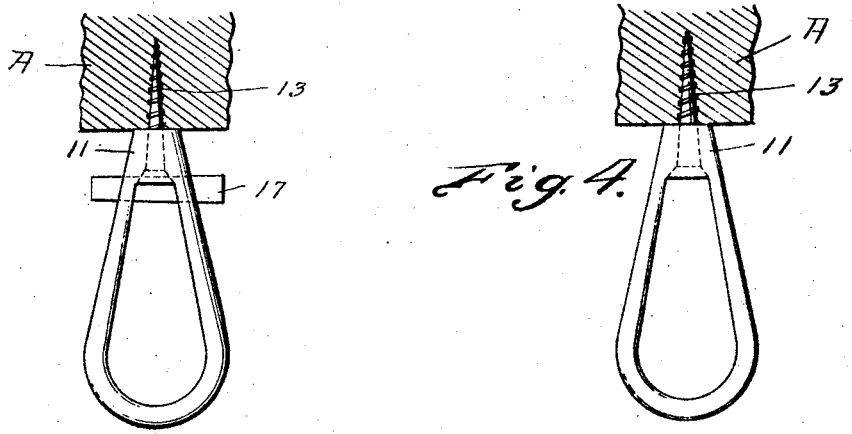
Figure 3 is an elevation showing the device in depending vertical position.
Figure 4 is a similar view showing the screw engaging member removed to define a swivel support.

Obviously, the device need not be constructed as a hook as the side formed with the opening 14 might be continuous, instead of interrupted, so as to define a loop, as indicated in Figures 3 and 4. Quite naturally, the device need not be used in horizontal position, as shown in Figures 1 and 2, but might be arranged to depend vertically from a support, as indicated in Figure 3. If a swivel mounting is desired, the wedge element may be removed whereupon the body of the device may rotate upon the screw, this alternative use being illustrated in Figure 4.

If the hook or loop, whichever is preferred, is desired for use as a handle in lifting patterns from molds, such as is necessary in foundry practice, the screw is forced into the pattern so that the device will operate effectually as a lifting member. In such an instance the wedge may either be left in place or removed, whichever is most suitable to the individual case.

From the foregoing description and a study of the drawings it will be apparent that I have thus provided a suspension hook, loop or handle device adapted for service for many purposes and which, on account of its extreme simplicity, will cost very little and not be likely to get out of order.

While I have shown and described the preferred embodiment of my invention, it is of course to be understood that I reserve the right to make such changes in the form, construction and arrangement of parts as will not depart from the spirit of the invention or the scope of the subjoined claims.

Having thus described my invention, what I claim as new and desire to secure by Letters Patent, is:

1. A handle device comprising an open frame-like body member formed at one end with a shank having a smooth bored hole therethrough, a screw engaged through said hole and adapted for penetrating engagement with a support or article, the screw acting to hold the handle member swivelly with respect to the support or article, the screw having a slot in its head, the opposite sides of the body member being formed with slots of unequal lengths adapted to be brought into registration with the slot in the screw, and a wedge disposable through the slots for locking the screw with respect to the handle member whereby the latter may be employed for rotating the screw for effecting insertion or removal thereof, the wedge member having its ends projecting beyond the body member whereby the smaller end of the wedge will be exposed and capable of receiving an impact for effecting removal.

2. A device of the character described comprising an open body member provided at one end with a shank having a hole therethrough, a screw engaged through said hole, and removable means engaging the screw and the body for preventing relative rotation, said means comprising a wedge member passed through alining slots in the opposite sides of the body and engaging wihin the groove in the screw head.

3. A device of the character described comprising an open frame-like body formed at one end with a shank having a countersunk hole therethrough extending longitudinally of the axis of the body, a screw engaged within said hole and having its head seating within said counter-sink, the opposite sides of the body being formed with alining slots, and a movable wedge member engaged through the slots and within the groove in the screw head.

In testimony whereof I affix my signature.

PARRIS FISHER.